United States Patent
Prabhakar et al.

(10) Patent No.: US 10,210,029 B2
(45) Date of Patent: *Feb. 19, 2019

(54) SYSTEM AND METHOD FOR SUPPORTING REPRESENTATIONAL STATE TRANSFER SERVICES NATIVELY IN A SERVICE BUS RUNTIME

(71) Applicant: Oracle International Corporation, Redwood Shores, CA (US)

(72) Inventors: Kiran Prabhakar, Cupertino, CA (US); Greg Fichtenholtz, Sunnyvale, CA (US); Dimitri Laloue, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,136

(22) Filed: Apr. 10, 2017

(65) Prior Publication Data

US 2017/0212795 A1    Jul. 27, 2017

Related U.S. Application Data

(63) Continuation of application No. 15/088,772, filed on Apr. 1, 2016, now Pat. No. 9,652,269.

(Continued)

(51) Int. Cl.
*G06F 3/00* (2006.01)
*G06F 9/54* (2006.01)
*G06F 9/455* (2018.01)

(52) U.S. Cl.
CPC .......... *G06F 9/546* (2013.01); *G06F 9/45529* (2013.01); *G06F 9/54* (2013.01); *G06F 9/547* (2013.01)

(58) Field of Classification Search
CPC ........................................... G06F 9/54
(Continued)

(56) References Cited

U.S. PATENT DOCUMENTS 7,681,203 B2    3/2010  Mandato
9,672,137 B1    6/2017  Allocca
(Continued)

OTHER PUBLICATIONS

Eric Wohlstadter, Web Service Mashup Middleware with Partitioning of XML Pipelines (Year: 2009).*

(Continued)

*Primary Examiner* — Lechi Truong
(74) *Attorney, Agent, or Firm* — Tucker Ellis LLP

(57) ABSTRACT

In accordance with an embodiment, described herein is a system and method for supporting REST services natively in a service bus runtime. The service bus runtime can include one or more native REST proxy services, one or more native REST pipelines, and one or more native REST reference services. A native REST proxy service can deliver a message payload of a REST native format into a native REST pipeline, which can process the payload without converting the payload to or from an XML-based Simple Object Access Protocol (SOAP) format. JavaScript code can be supported in the pipeline to manipulate the message payload. A REST branch node can be used in the service bus runtime to route a message based on an HTTP verb or a relative URL path in a header of the message.

22 Claims, 13 Drawing Sheets

Related U.S. Application Data

(60) Provisional application No. 62/142,889, filed on Apr. 3, 2015.

(58) Field of Classification Search
USPC .................................................. 719/328
See application file for complete search history.

(56) References Cited

U.S. PATENT DOCUMENTS

| | | |
|---|---|---|
| 2006/0034237 A1 | 2/2006 | Patrick |
| 2008/0310392 A1 | 12/2008 | Dowling |
| 2011/0131318 A1 | 6/2011 | Maes |
| 2011/0265164 A1 | 10/2011 | Lucovsky |
| 2012/0089726 A1 | 4/2012 | Doddavula |
| 2012/0185821 A1 | 7/2012 | Yaseen |
| 2012/0239620 A1 | 9/2012 | Masini |
| 2013/0019000 A1* | 1/2013 | Markus .............. G06F 9/466 709/223 |
| 2013/0046894 A1 | 2/2013 | Said |
| 2013/0086204 A1 | 4/2013 | Ghosh |
| 2014/0032531 A1 | 1/2014 | Ravi |
| 2014/0075016 A1 | 3/2014 | Chatterjee |
| 2014/0173594 A1 | 6/2014 | Ng |
| 2014/0181306 A1 | 6/2014 | Kothamasu |
| 2014/0280494 A1* | 9/2014 | Samoylenko ....... H04L 67/10 709/203 |
| 2015/0019735 A1 | 1/2015 | Pogrebinsky |
| 2015/0067013 A1* | 3/2015 | Scoda ................ H04L 67/10 709/201 |
| 2015/0213259 A1* | 7/2015 | Du .................... H04L 63/1466 726/27 |
| 2016/0026461 A1 | 1/2016 | Bannister |
| 2016/0088023 A1 | 3/2016 | Handa |
| 2016/0171682 A1* | 6/2016 | Abedini ............. G06T 7/0012 382/132 |

OTHER PUBLICATIONS

Joe Zou et al., "From Representational State Transfer to Accountable State Transfer Architecture", 8 pages, 2010.

REST Resources and Methods, December 8, 2014, SmartBear Software, 6 Pages.

Getting Started with Rest APIs—Enterprise Service Bus 4.7.0—WS02 Documentation, 11 Pages.

United States Patent and Trademark Office, Office Action dated Feb. 14, 2018 for U.S. Appl. No. 15/088,790, 13 Pages.

Raul Garcia-Tinedo et al., "Cloud-as-a-Gift: Effectively Exploiting Personal Cloud Free Accounts via REST APIs", 2013 IEEE Sixth International Conference on Cloud Computing, © 2013 IEEE, pp. 621-628.

Hiranya Jayathilaka, "How to Get a Cup of Coffee the WSO2 Way", Sep. 10, 2012, 38 pages, retrieved from: <https://wso2.com/library/articles/2012/09/get-cup-coffee-wso2-way/>.

\* cited by examiner

US 10,210,029 B2

SYSTEM AND METHOD FOR SUPPORTING REPRESENTATIONAL STATE TRANSFER SERVICES NATIVELY IN A SERVICE BUS RUNTIME

CLAIM OF PRIORITY

This application is a continuation of U.S. patent application Ser. No. 15/088,772, filed Apr. 1, 2016, now U.S. Pat. No. 9,652,269, issued May 16, 2017, entitled "SYSTEM AND METHOD FOR SUPPORTING REPRESENTATIONAL STATE TRANSFER SERVICES NATIVELY IN A SERVICE BUS RUNTIME", which claims the benefit of priority to U.S. Provisional Application titled "SYSTEM AND METHOD FOR SUPPORTING NATIVE REST SERVICES IN AN ENTERPRISE SERVICE BUS ENVIRONMENT", Application No. 62/142,889, filed Apr. 3, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to service bus systems, and are particularly related to a system and method for supporting representational state transfer (REST) services natively in a service bus runtime.

BACKGROUND

A service bus system, for example Oracle Service Bus (OSB), provides a software architecture for mediating messages among services that are loosely coupled, independently deployed, and heterogeneous and disparate. A service bus system can include a service bus runtime, and a management console used for configuring and managing the service bus runtime.

With the popularity of cloud applications and mobile applications, a service bus system may need to mediate an increasing number of messages between a mobile application and a cloud service. As such, it is important for a service bus system to provide a mechanism to achieve optimized data pass-through.

SUMMARY

In accordance with an embodiment, described herein is a system and method for supporting REST services natively in a service bus runtime. The service bus runtime can include one or more native REST proxy services, one or more native REST pipelines, and one or more native REST reference services. A native REST proxy service can deliver a message payload of a REST native format into a native REST pipeline, which can process the payload without converting the payload to or from an XML-based Simple Object Access Protocol (SOAP) format. JavaScript code can be supported in the pipeline to manipulate the message payload. A REST branch node can be used in the service bus runtime to route a message based on an HTTP verb or a relative URL path in a header of the message.

DETAILED DESCRIPTION

In accordance with an embodiment, described herein is a system and method for supporting REST services natively in a service bus runtime. The service bus runtime can include one or more native REST proxy services, one or more native REST pipelines, and one or more native REST reference services. A native REST proxy service can deliver a message payload of a REST native format into a native REST pipeline, which can process the payload without converting the payload to or from an XML-based Simple Object Access Protocol (SOAP) format. JavaScript code can be supported in the pipeline to manipulate the message payload. A REST branch node can be used in the service bus runtime to route a message based on an HTTP verb or a relative URL path in a header of the message.

Service Bus Runtime

Figure 1:
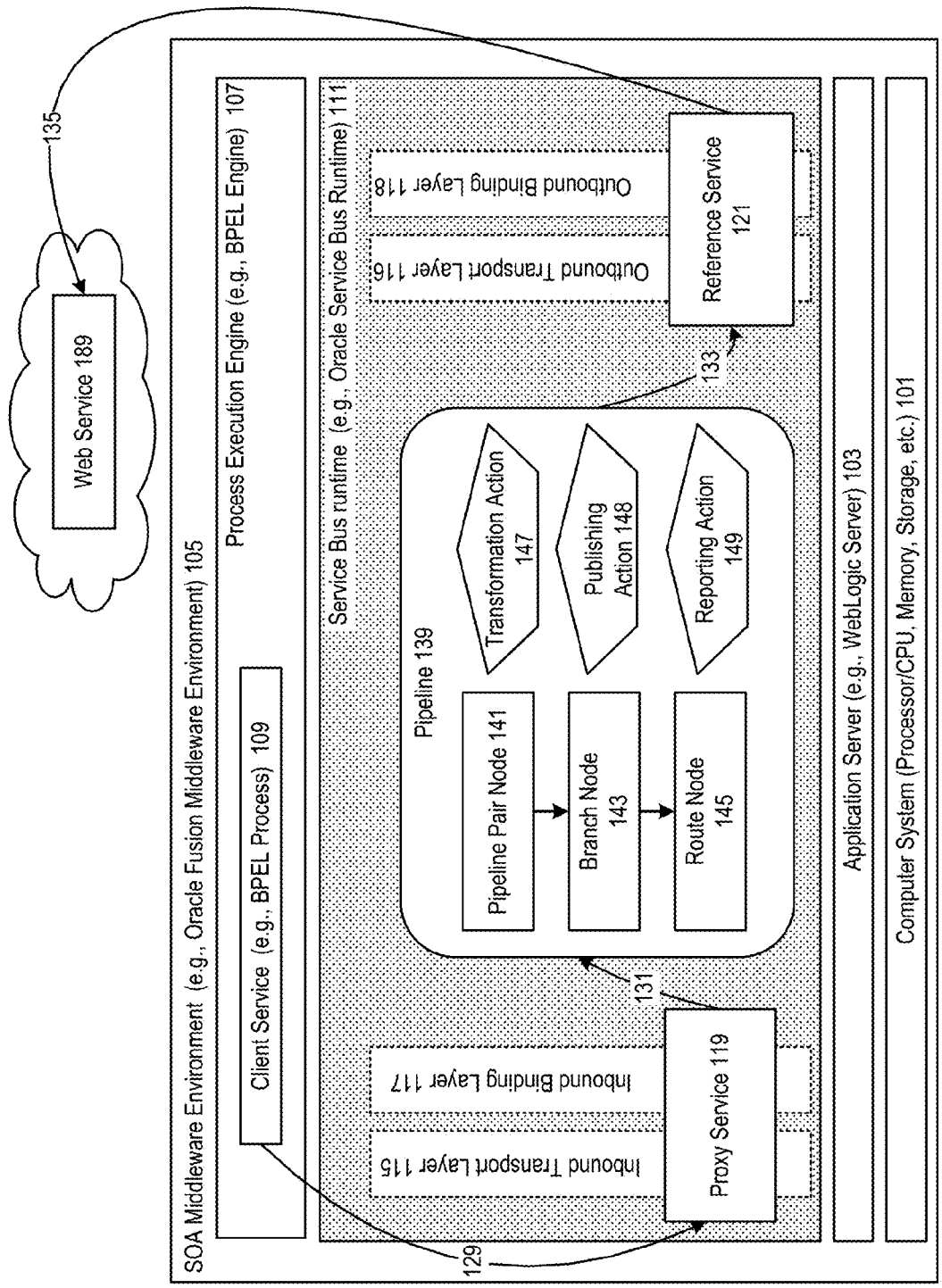
FIG. 1 illustrates a service bus runtime, in accordance with an embodiment.

FIG. 1 illustrates a service bus runtime, in accordance with an embodiment.

As shown in FIG. 1, a service bus runtime (for example, an Oracle Service Bus runtime) 111 can be provided as a software component within a service-oriented architecture (SOA) middleware environment (for example, an Oracle Fusion middleware environment) 105 which executes on an application server (for example, WebLogic Server) 103 on a computer 101 including memory and microprocessors.

In accordance with an embodiment, the service bus runtime can include one or more proxy services (for example proxy service 119), and one or more reference services (for example, reference service 121).

As used herein, in accordance with an embodiment, a proxy service represents a service bus definition of an intermediary web service hosted locally in the service bus runtime. A proxy service's configuration can include its interface, the type and configuration of the transport it uses to connect with a client service, security requirements, and service level agreement (SLA) alert rules.

In accordance with an embodiment, the implementation of a proxy service can be defined by a message flow, which can include a plurality of components to define a logic for routing and manipulating messages as they flow through the proxy service. The message processing logic in a message flow can be defined by a pipeline. A pipeline represents a sequence of user-configured processing steps (stages) for a message. Each stage can be a pipeline element, and can include one or more actions that define the handling of messages as the messages flow through a proxy service at runtime. A pipeline can also be associated with a plurality of nodes configured to route messages through the pipeline.

As shown in FIG. 1, a pipeline 139 can include a pipeline pair node 141, a branch node 143 and a route node 145. The pipeline pair node can tie together a single request and a single response pipeline into one top-level element. The branch node enables message processing to proceed down one of several possible paths by comparing values in a table of string values with a value in a message. The route node can define destinations for messages, and can perform request and response communication with another service. A plurality of actions (for example, transformation action 147, publishing action 148, and reporting action 149) can be associated with the pipeline to implement a processing logic for the messages.

As used herein, in accordance with an embodiment, reference services can be a service bus definition of an external service to which the service bus runtime is a client, and can be used to define access to the external service.

For example, the reference service shown in FIG. 1 can define how to access 135 an external web service 189, and can specify an endpoint URI/location and interface of the external web service.

In accordance with an embodiment, the service bus runtime can include an inbound transport layer 115 and an outbound transport layer 116, and an inbound binding layer 117 and an outbound binding layer 118. The inbound transport layer is a communication layer between a client service and the service bus runtime, and acts as the entry point for messages into the service bus runtime. It can handle raw bytes of message data in the form of input/output streams, including returning response messages to a client service and handling meta-data for messages, including endpoint URIs and transport headers. The inbound transport layer can support a plurality of transport protocols, including HTTP (S), JMS, FTP, File, and E-mail. Similarly, the outbound transport layer handles communication between external services and the service bus runtime, and supports the plurality of transport protocols as described above.

In accordance with an embodiment, the inbound binding layer and the outbound binding layer can pack and unpack messages as necessary, handle messages security, and hand the messages off to pipelines for processing.

In accordance with an embodiment, the service bus runtime can provide intelligent message brokering between external services (for example, enterprise services and databases) and service clients (for example, presentation applications) through proxy services, which can be developed using an interactive development environment (IDE) (for example, Oracle JDeveloper), or configured using a web-based management console (for example, Oracle service bus console). The service bus runtime can enable client services to exchange messages with an intermediary proxy service, rather than directly with a reference service. Since a proxy service can be independently implemented and dynamically configured, as driven by business needs, the service bus runtime can route messages between different types of services, without requiring costly infrastructure development and re-deployment efforts.

In the exemplary service bus runtime as shown in FIG. 1, the proxy service can receive 129 a message from a client service 109 in a process execution engine 107, and pass 131 the message to the pipeline which can transform data of the message into a format required by the reference service. The proxy service can receive 133 the message from the reference service, and send the message to the external web service in the cloud. The process execution engine can be a business process language execution (BPEL) engine, and the client service can be a BPEL process instance executing on the process execution engine.

In accordance with an embodiment, a message routed through the service bus runtime can be associated with a message context defined by an XML schema. The message context can include a set of properties (context variables) holding content of the message and information for the message. The message context variables can be accessed and manipulated using, for example XQuery expressions, in actions in pipeline stages. The context variables can include a header, a body and an attachment which can be initialized using the message content received by a proxy service. The message content in the context variables can be used to construct outgoing messages routed or published to other services.

In accordance with an embodiment, a proxy service or reference service can be implemented using Simple Object Access Protocol (SOAP) and defined by a web service definition language (WSDL) file, or representational state transfer (REST) architectural style.

REST represents an architectural style that specifies a plurality of architecture constraints (for example, decoupling consumer services from producer services, stateless existence, and uniform interface). A REST-based service (REST service) typically uses HTTP as its underlying protocol and uses HTTP requests to post data, get data, and delete data. A REST service can be associated with a web application description language (WADL) document that describes and defines the REST service.

In accordance with an embodiment, the service bus runtime can include a virtualization layer to support REST services, which can invoke, or be invoked by, a WSDL-based pipeline. A REST proxy service can convert a payload of a REST native format, for example JavaScript Notation (JSON) format, to SOAP format before invoking a pipeline, while a REST reference services can be invoked by a pipeline, and can convert the payload from SOAP to a REST native format.

Native Support for REST Services

In a service bus runtime as described above, support for REST services often are limited to REST proxy service and REST reference services, which expose REST endpoints. The internal interface (for example, pipelines) can still be WSDL-based.

In accordance with an embodiment, described herein is a system and method for supporting REST services natively in a service bus runtime. The service bus runtime can include one or more native REST proxy services, one or more native REST pipelines, and one or more native REST reference services. A native REST proxy service can deliver a message payload of a REST native format into a native REST pipeline, which can process the payload without converting the payload to or from an XML-based SOAP format. JavaScript code can be supported in the pipeline to manipulate the message payload. A REST branch node can be used in the service bus runtime to route a message based on an HTTP verb or a relative URL path in a header of the message.

In accordance with an embodiment, by natively supporting REST services, the service bus runtime can support messages of REST native types, including JSON, XML, text, and binary, without transforming the messages to or from a SOAP-based format.

In accordance with an embodiment, each of the REST proxy services, REST pipelines, and REST reference services can be a native REST service, which does not need to be associated with a WSDL file, and does not have information of the shape (e.g., structure or schema information) of messages coming into and out of that service.

In accordance with an embodiment, a native REST service can be un-typed or typed. An un-typed native REST service is not bound to a WADL document, while a typed native REST service can be bound to a WADL that includes schema information for use by a development tool (for example, JDeveloper) at design time.

In accordance with an embodiment, a native REST service can co-exist with a WSDL-based REST service in the system. A user can create either a native REST service or a WSDL-based REST service based on a specific use case. The differences between the two types of REST services are hidden from the user via UI constructs. The user can choose to create a REST service without specifying whether to create a native REST service or a WSDL-based REST service. Based on one or more selections from the user, a design tool can create a native REST service with configurations that correspond to the user's selection.

Figure 2:
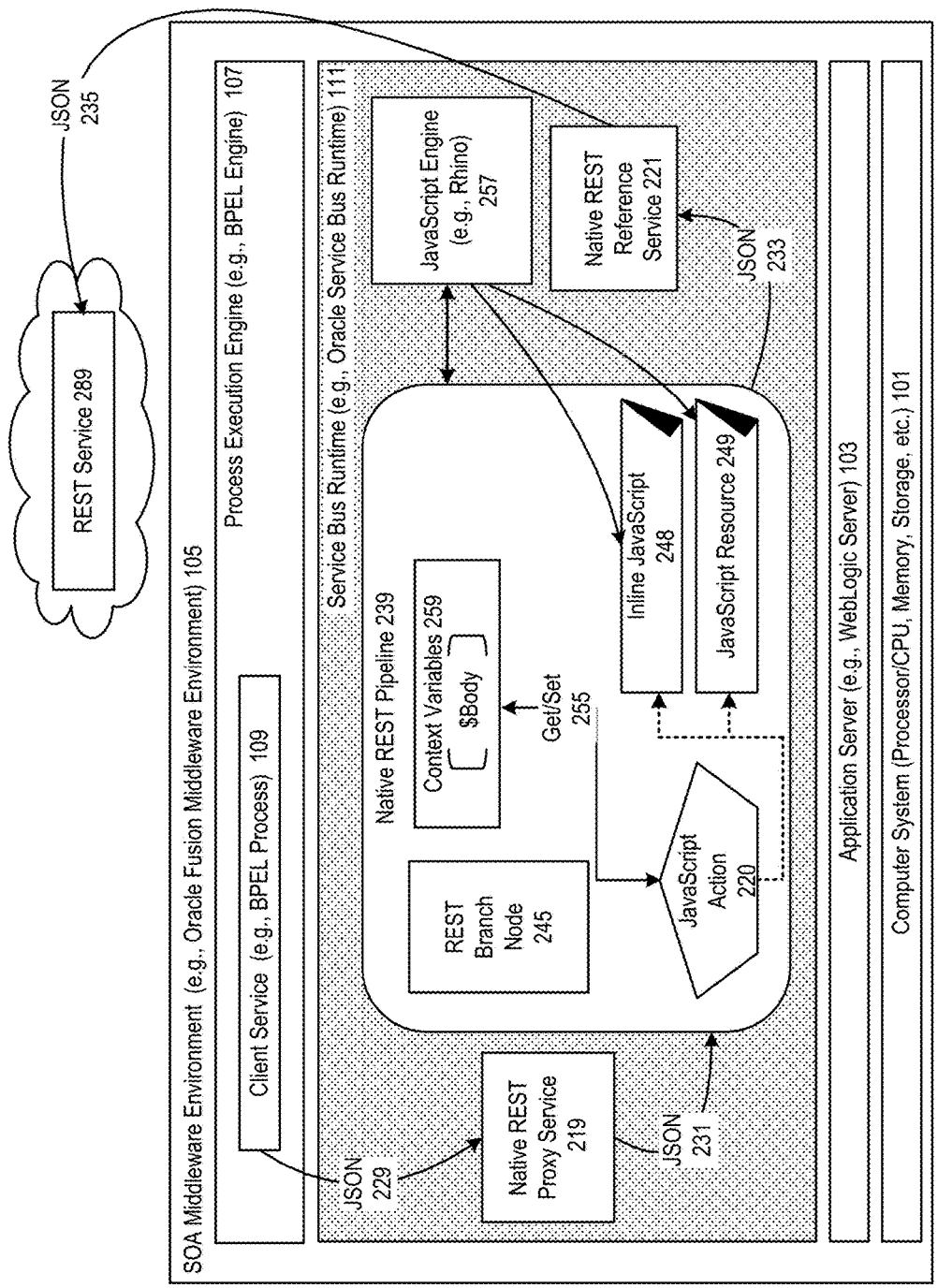
FIG. 2 illustrates a system for supporting REST services natively in a service bus runtime, in accordance with an embodiment.

FIG. 2 illustrates a system for supporting REST services natively in a service bus runtime, in accordance with an embodiment.

As shown in FIG. 2, the system includes a native REST pipeline 239 that defines a REST proxy service 219. The native REST pipeline can further include a REST branch node 245 that enables users to implement branching logic based on an HTTP verb and a URL path/segment as well as the value(s) of HTTP Content-Type header, a JavaScript action 220 for getting and setting 255 bindings of context variables 259 of the service bus runtime, and a JavaScript engine 257 for executing JavaScript code in the JavaScript action and providing bindings for the context variables.

As described above, a pipeline action can be an element of a pipeline stage that defines the handling of messages as the messages flow through a proxy service at runtime. In accordance with an embodiment, the JavaScript action, as a pipeline action, can be configured to process message context variables in the service bus runtime.

As further shown, the JavaScript action can be configured to include an inline JavaScript code (e.g., a JavaScript snippet) 248, or reference a JavaScript resource 249. A JavaScript execution in the JavaScript action can be configured to complete within a specified time interval, or a default value (for example, 30 seconds). If the JavaScript execution takes longer than the specified time interval, it can be aborted with an error. Global settings can contain a default value for the time interval after which any JavaScript can be aborted with an error.

In accordance with an embodiment, the system can process a message of a particular REST native format without converting the message to or from a SOAP format. Native REST formats can include JSON, XML, text, form URL-encoded, and binary.

As shown in FIG. 2, a JSON message from the client service 109 can be received 229 at a native REST proxy service 219, which passes 231 the JSON message to the native REST pipeline. The body of the JSON message can be parsed into a JSON-specific plain old Java object (POJO) model expected by the JavaScript action, and stored in a context variable "body" as indicated by "$Body" in the figure. When the JavaScript action queries the "body" variable, only the actual payload can be returned, without SOAP:Body XML element tag, to simplify manipulation of the variable.

In accordance with an embodiment, the header of the JSON message can include metadata of the message, including a request URL and an HTTP verb (for example, GET, POST, PUT or DELETE). The REST branch node can route 233 the JSON message to a native REST reference service 221 down a particular branch defined by the REST branch node. The native REST reference service can send 235 the JSON message to an external REST service 289.

As illustrated above, the system can support native REST services to enable support for end-to-end JSON messages. A JSON message passed through the service bus runtime does not need to be converted into an XML-based SOAP format and converted back to a JSON format when being routed to a reference service.

In accordance with an embodiment, a payload with a "content-type "application/json" can be considered a JSON payload and parsed accordingly into a JSON native data model. If the "body" variable ($body) needs to be logged, the character data of the JSON payload can be wrapped with a "soap:Body tag", as shown below:

$body=<soap-env:Body><![CDATA[{"foo1":"foo2"}]]
><soap-env:Body>

In accordance with an embodiment, if the JSON payload is configured to be manipulated by the JavaScript action, the JSON native object can be wrapped in a scriptable facade required by JavaScript.

Other REST Native Formats

As described above, in accordance with an embodiment, in addition to JSON, a native REST service can also receive and send a payload with one of the following content-types/data formats: text/xml or application/xml (XML payload); text/plain, application/text or x-www-form-urlencoded (text payload); binary; and custom data formats.

In accordance with an embodiment, XML payloads in native REST binding can be modeled like "Messaging/XML" content, where the "$body" can contain inline payload XML. Text payloads in native REST binding can be modeled like Messaging/text, where the "$body" can contain inline payload character data. When the native REST pipeline has content streaming enabled, text and XML content can be handled without full materialization.

In accordance with an embodiment, a payload in a binary format can include any content type other than the following: application/json, application/xml, text/xml, text/plain, application/text, and application/x-www-form-urlencoded. The binary format can be used to send a binary message (for example, an image file), as a response from a native REST proxy service or as a request to a native REST reference service, or to receive a binary message as a response to a native REST reference service or a request to a native REST proxy service. A binary payload can be stored in a binary repository. The $body variable can contain a reference to the binary repository using the <ctx:binary-content> element.

When the native REST pipeline has content streaming enabled, a binary payload can be processed in a streaming fashion.

In accordance with an embodiment, for a custom data format, custom XPath functions or a Java callout action can be used to convert binary to text, XML, or JSON text.

Figure 3:
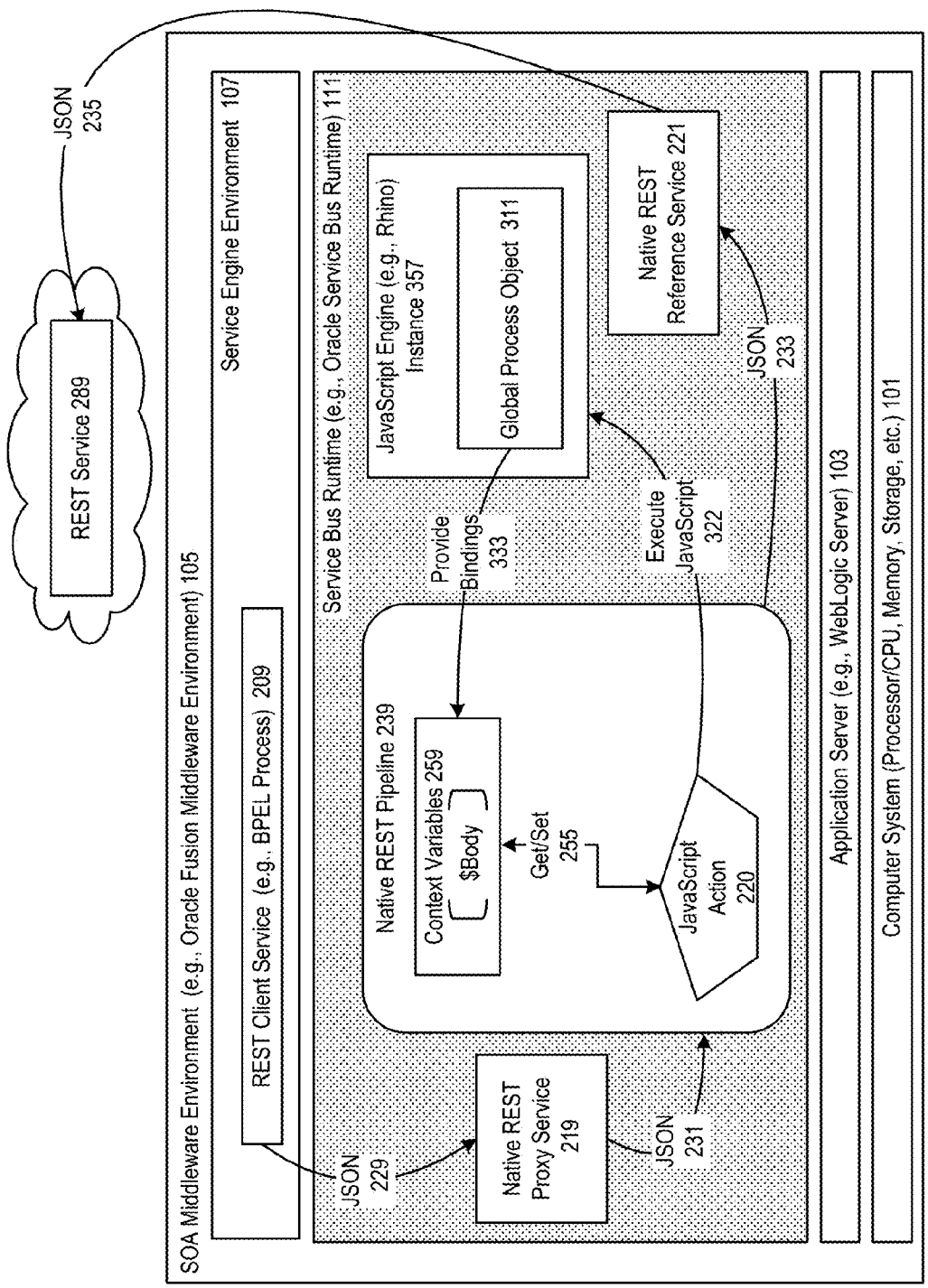
FIG. 3 further illustrates a system for supporting REST services natively in a service bus runtime, in accordance with an embodiment.

FIG. 3 further illustrates a system for supporting REST services natively in a service bus runtime, in accordance with an embodiment.

As shown in FIG. 3, an instance 357 of the JavaScript engine can be created, to provide 333 bindings for context variables in the service bus runtime, and execute 322 user-written JavaScript code in the JavaScript action, which can be available to the native REST pipeline and a plurality of pipelines of other types.

In accordance with an embodiment, a JavaScript engine construct (e.g., a global process object) 311 can be provided in the JavaScript engine instance to facilitate the JavaScript action retrieving context variable bindings (values) from the context variables, and updating the context variables with new variable bindings, so that the variable bindings can be manipulated in the JavaScript action.

For example, a global object "process" can be bound to a particular context variable before the context variable is to be accessed. A dot notation (for example, process. body) can be used to access a particular context variable.

In accordance with an embodiment, a dot notation expression described above can return a JSON scriptable object when the context variable that has been accessed is a JSON variable, or an E4X type (JavaScript XML format) when that variable is an XML variable. A string or Boolean variable can be returned in other circumstances.

As an illustrative example, when a JSON message is received in an incoming request from a service client, the payload of the JSON message is:

```
{
    "employees": [
        { "firstName":"John" , "lastName":"Doe" },
        { "firstName":"Anna" , "lastName":"Smith" },
        { "firstName":"Peter" , "lastName":"Jones" }
    ]
}
```

The JSON payload can be parsed into a POJO model expected by the JavaScript engine, and bound to the context variable "body". The context variable can subsequently be accessed and manipulated using the following JavaScript expressions in the JavaScript action:

```
var $body = process.body;
print( $body.employees[0].firstName + " " +
    $body.employees[0].lastName );
```

The above expressions can print "John Doe" in a console window.

In accordance with an embodiment, the JavaScript action can consume and update context variables of a plurality of variable types, including XML, String, Boolean, and JSON.

As an illustrative example, a context variable $foo can be bound to the following XML code:

```
<rdf:RDF xmlns:rdf="http://www.w3.org/1999/02/22-rdf-syntax-ns#"
xmlns="http://purl.org/rss/1.0/">
```

-continued

```
    <rdf:item value="5"/>
    <rdf:textNode>Hello World</rdf:textNode>
    <item value="10"/>
    <rdf:item>17</rdf:item>
</rdf:RDF>
```

The prefixes (rdf, rss) can be defined in a JavaScript engine execution scope, and mapped from a stage context or explicitly declared in a JavaScript snippet as follows:

```
var rdf = new Namespace("http://www.w3.org/1999/02/
22-rdf-syntax-ns#");
var rss = new Namespace("http://purl.org/rss/1.0/");
```

The following JavaScript expressions can be used to access the values in the XML code:

```
process.foo.rdf::item.@value => 5
process.foo.rdf::textNode.text( ) => "Hello World"
process.foo.rss::item.@value => 10
process.foo.rdf::item[1].text( ) => 17
```

Figure 4:
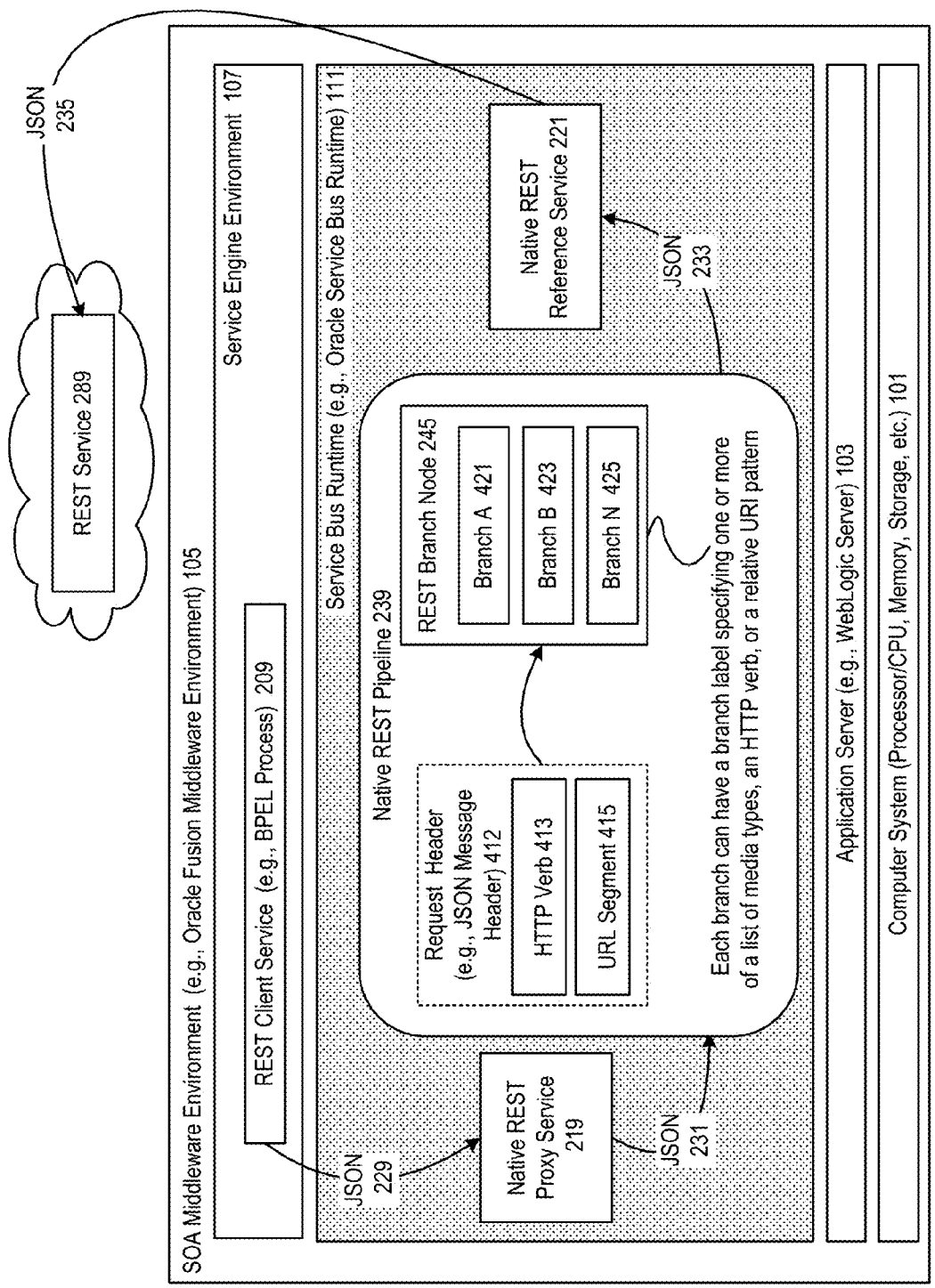
FIG. 4 further illustrates a system for supporting REST services natively in a service bus runtime, in accordance with an embodiment.

FIG. 4 further illustrates a system for supporting REST services natively in a service bus runtime, in accordance with an embodiment.

As shown in FIG. 4, a plurality of branches (for example, branch A 421, branch B 423, and branch N 425) can be defined for the REST branch node, and each branch can have a branch label specifying one or more options for use in filtering client requests.

In accordance with an embodiment, the options can include "consumes", "path", and "verb". The "consumes" option can include a list of data formats allowed for a particular branch. The "path" option can be a relative URL path/a single URI pattern (for example, a "/dogs/{id}). The "verb" can be a single HTTP verb allowed for a particular branch. The variable {id} and a value for the variable from an incoming request URL can be made available to nest actions in the pipeline.

In accordance with an embodiment, the REST branch node allows users to implement branching logic based on HTTP verbs and URL paths. A client request (for example, a JSON message) including an HTTP verb 413 and a relative URL path 415 in the request header 412 can be filtered, and routed to a particular branch in the REST branch node, based on a mapping between the HTTP verb and URL relative path in the request header with those specified in the label of the particular branch.

In accordance with an embodiment, if a REST branch label contains a parameterized path expression comprising one or more message context variables (for example, "/name/{PlaceName}/zip/{ZipCode}"), the one or more message context variables can be implicitly create to simplify configuration. The service bus runtime can automatically define the message context variables (for example, "PlaceName" and "ZipCode") with values being extracted from inbound HTTP relative path metadata.

In accordance with an embodiment, a routing options action in the pipeline can be provided to allow a user to specify a plurality of arguments so that a native REST service can be invoked. The plurality of arguments can include an HTTP verb, a relative path, a query parameters, and an accept header value.

Figure 5:
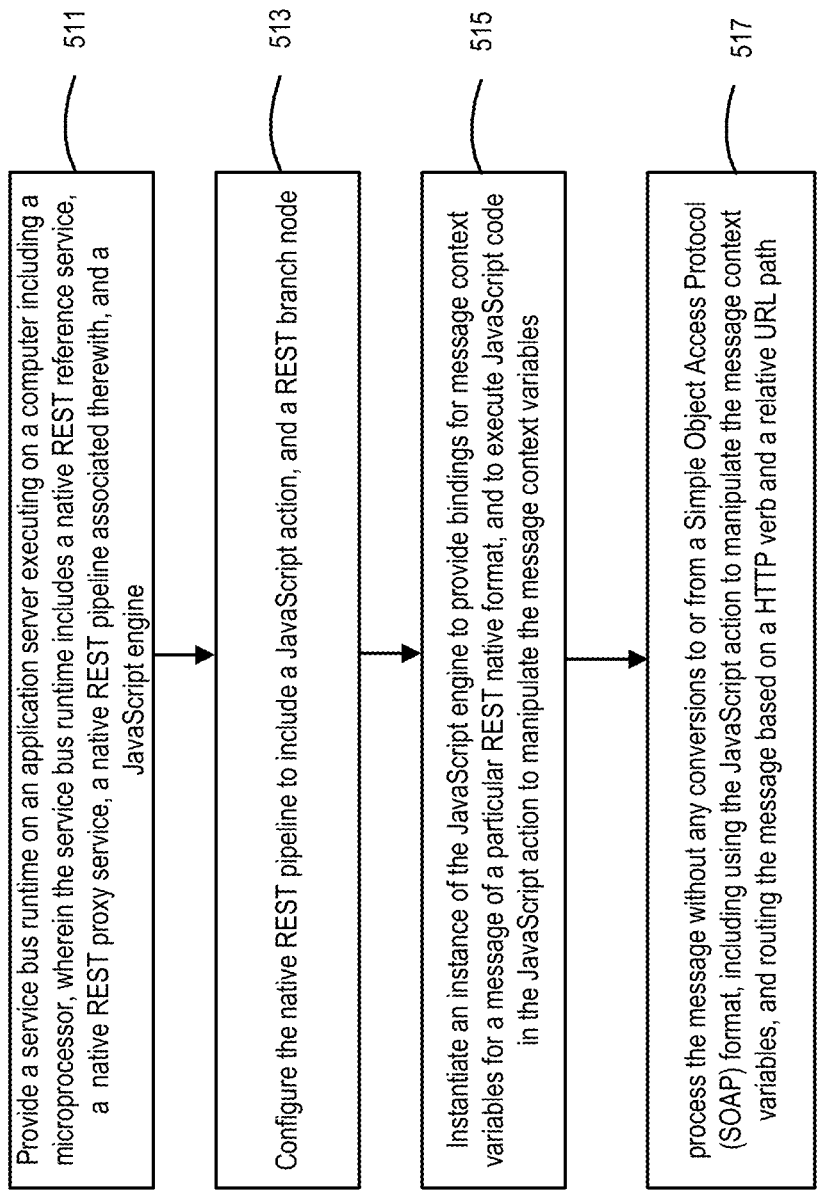
FIG. 5 illustrates a method for supporting REST services natively in a service bus runtime, in accordance with an embodiment.

FIG. 5 illustrates a method for supporting REST services natively in a service bus runtime, in accordance with an embodiment.

As shown in FIG. 5, at step 511, a service bus runtime can be provided on an application server executing on a computer including a microprocessor, wherein the service bus runtime includes a native REST reference service, a native REST proxy service, a native REST pipeline associated therewith, and a JavaScript engine.

At step 513, the native REST pipeline can be configured to include a JavaScript action and a REST branch node.

At step 515, an instance of the JavaScript engine can be instantiated to provide bindings for message context variables, and to execute JavaScript code in the JavaScript action.

At step 517, the service bus runtime can receive a message of a particular REST native format, and process the message without any conversions to or from a Simple Object Access Protocol (SOAP) media format, including using the JavaScript action to manipulate the message context variables, and routing the message based on a HTTP verb and a relative URL path.

Configuration Wizard for Creating REST Reference Services

In accordance with an embodiment, the system includes a configuration wizard for creating REST reference or proxy services for use in a service bus runtime. The configuration wizard can retrieve, based on a URI provided by a user, one or more resources of an external REST service, and can generate a plurality of properties for each resource. A plurality of interfaces can be provided to guide the user step by step in creating a REST reference service to access the external REST service. The user can make selections for each property and provide information if necessary. An API can be invoked to generate a REST reference service and a WADL file describing the REST reference service, based on the user's selections and the provided information. A different API can be used to generate a REST proxy service based on the WADL file to route a client message to the REST reference service.

In accordance with an embodiment, the configuration wizard can be used to enable the REST reference service and the REST proxy service in the service bus runtime, so that a client request for the external REST service can be appropriately routed using the enabled proxy service and reference service.

With the features described above, a user does not need to introspect an external REST service to obtain its resources and related properties when creating a REST reference service. The configuration wizard can automatically retrieve the information based on a base URI provided, and generate options for the user to select.

Figure 6:
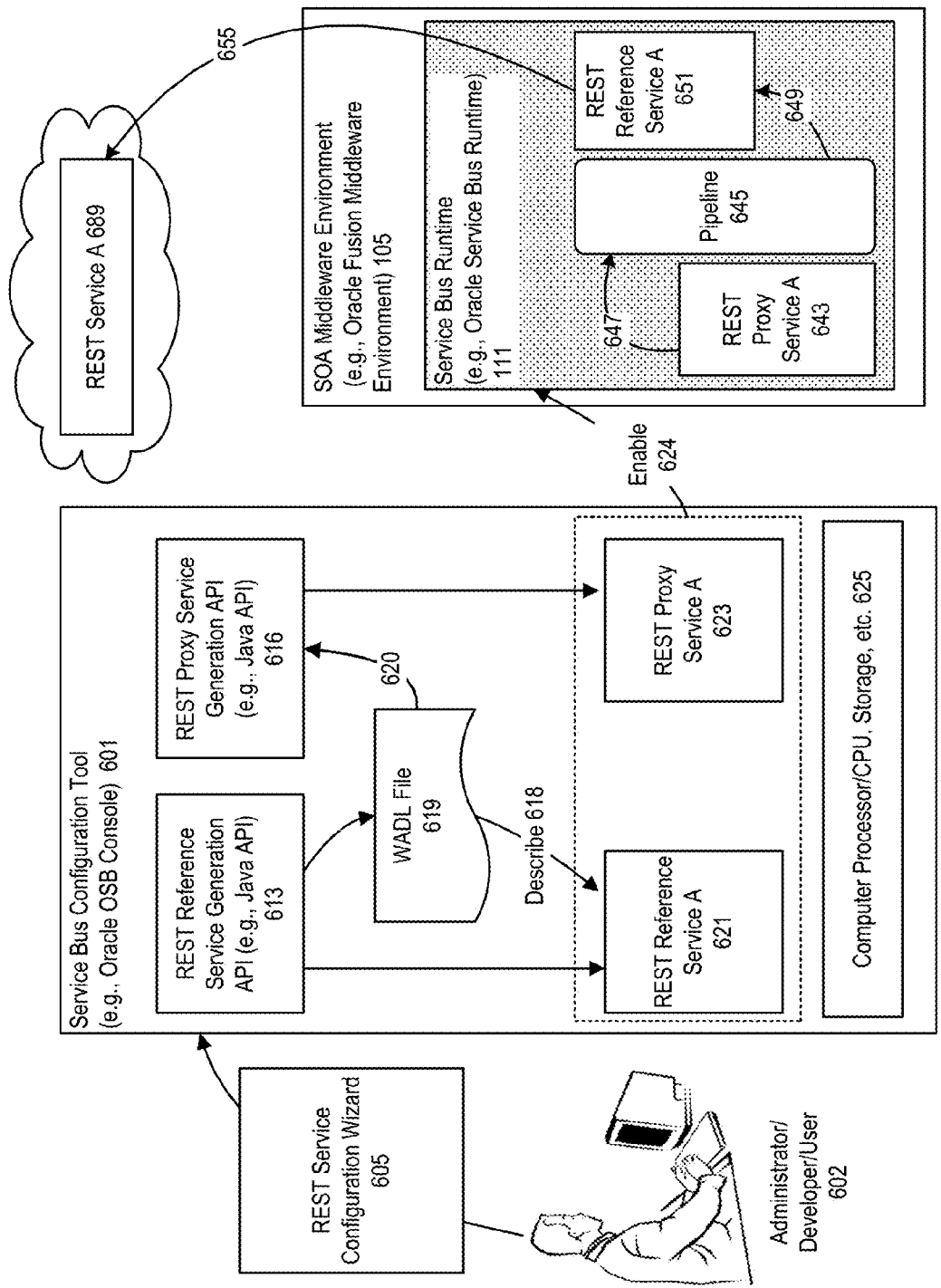
FIG. 6 illustrates a system for providing a configuration wizard for use in creating a REST reference or proxy service, in accordance with an embodiment.

FIG. 6 illustrates a system for providing a configuration wizard for use in creating a REST reference or proxy service, in accordance with an embodiment.

As shown in FIG. 6, the system includes a service bus configuration tool (for example, an Oracle Service Bus Console) 601 with a configuration wizard (for example, REST service configuration wizard 605). The configuration wizard can include a plurality of interfaces that can guide a user (for example, a service bus administrator) 602 to create a REST reverence service, or REST proxy service, based on the user's selection. The user can also select to create a native REST service or a non-native REST service.

In accordance with an embodiment, the configuration wizard can prompt the user to provide a base URI of an external REST service (for example, REST service A 689).

The configuration wizard can retrieve resources and their related properties of the external REST service based on the provided base URI, and use the retrieved information to generate options, and to display the generated options on the plurality of interfaces for the user to select.

In accordance with an embodiment, the user can add one or more resources to be included in the REST reference service to be created. For each added resource, the user can select one or more methods, and an HTTP verb for that method.

When the user completes each interface in the configuration wizard, an action button (for example, a "create" button") can be pressed to invoke a REST reference service generation API 613 (for example, a Java API) to generate a REST reference service (for example, REST reference service A) 621, and a WADL file 619 that describes 618 the REST reference service.

In accordance with an embodiment, if the user selects to create a REST proxy service to define message flows to a REST reference service, a different REST service generation API (for example, REST proxy service generation API 616) from the REST reference service generation API can be invoked to generate a REST proxy service (for example, REST proxy service A 623) based on 620 the WADL file.

In accordance with an embodiment, the system can subsequently activate a session in which the REST reference service and the REST proxy service are created, so that the REST services can be enabled 635 for execution in the service bus runtime.

As shown in FIG. 6, the enabled REST proxy service (for example, REST Proxy Service A) 643 can route 647 a message (for example, a JSON message) through a pipeline 645 to the enabled REST reference service (for example, REST reference service A) 651, which can send 655 the message to the external REST service.

FIGS. 7-10 further illustrate a system for providing a configuration wizard for use in creating a REST reference or proxy service, in accordance with an embodiment.

Figure 7:
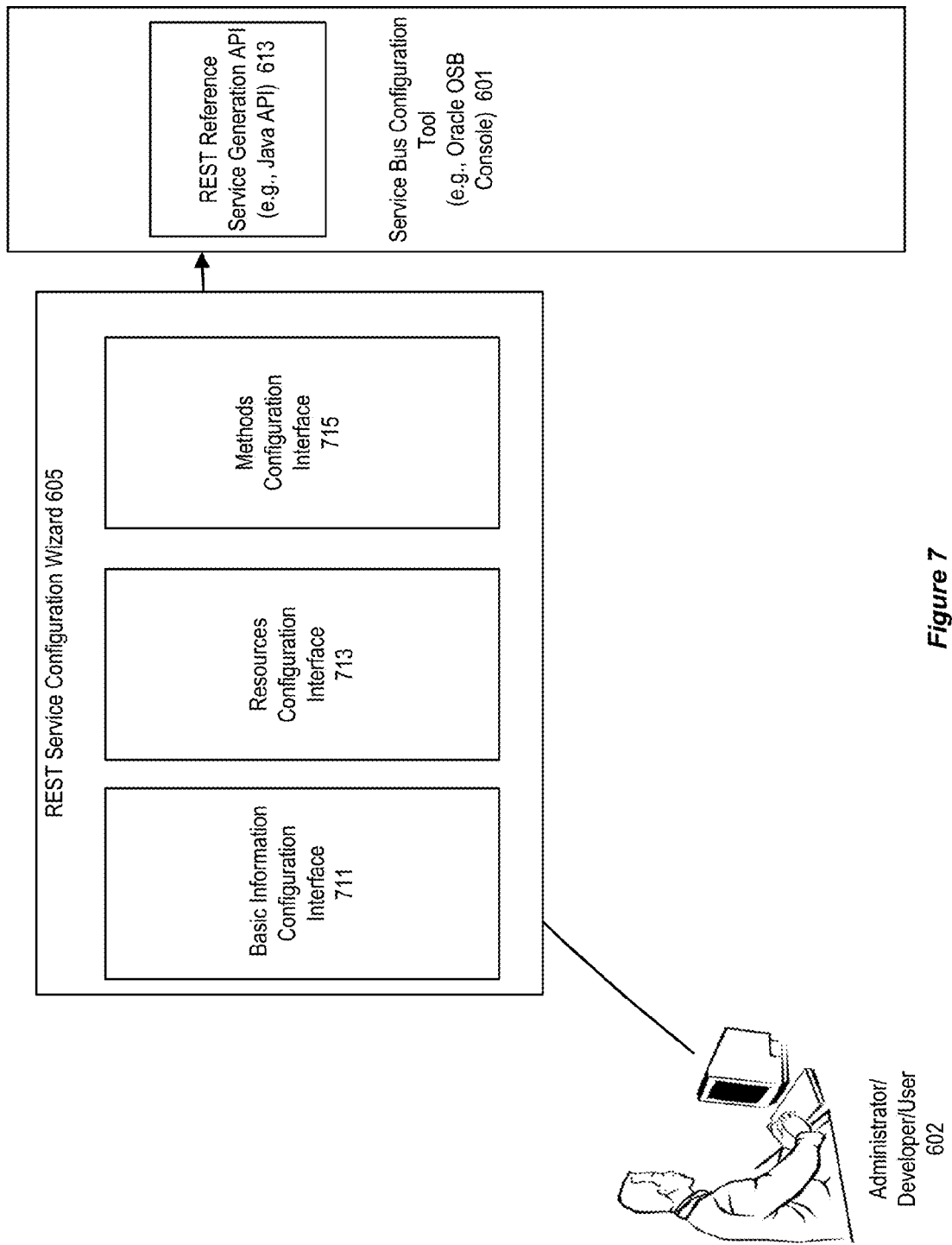
FIGS. 7-10 further illustrate a system for providing a configuration wizard for use in creating a REST reference or proxy service, in accordance with an embodiment.

As shown in FIG. 7, the configuration wizard can include a basic information configuration interface 711, a resources configuration interface 713, and a methods configuration interface 715, to display information related to the external REST service for the user to select when creating a REST reference service. Additional details for each interface can be illustrated in FIGS. 8-10.

Figure 8:
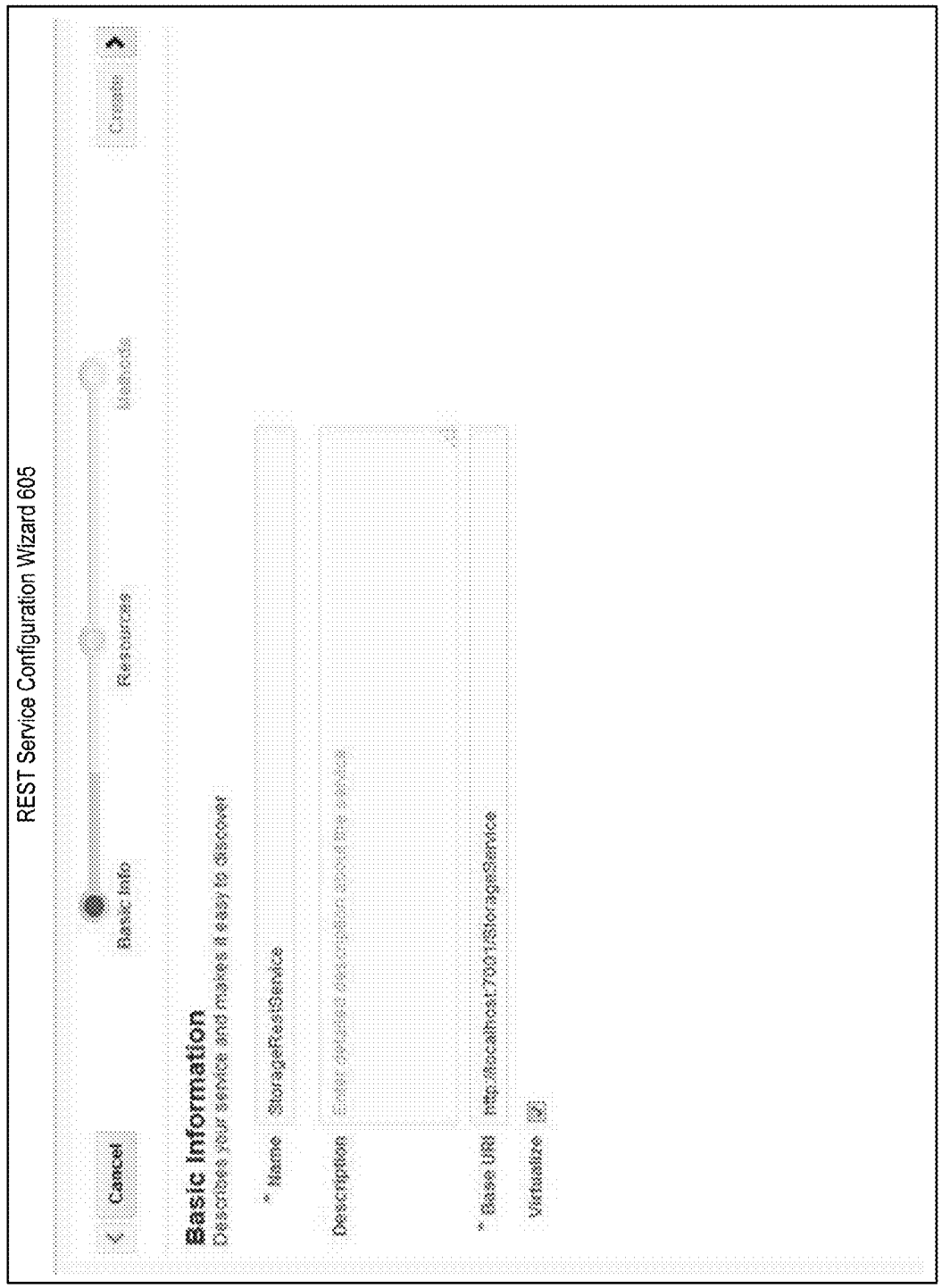
Figure 9:
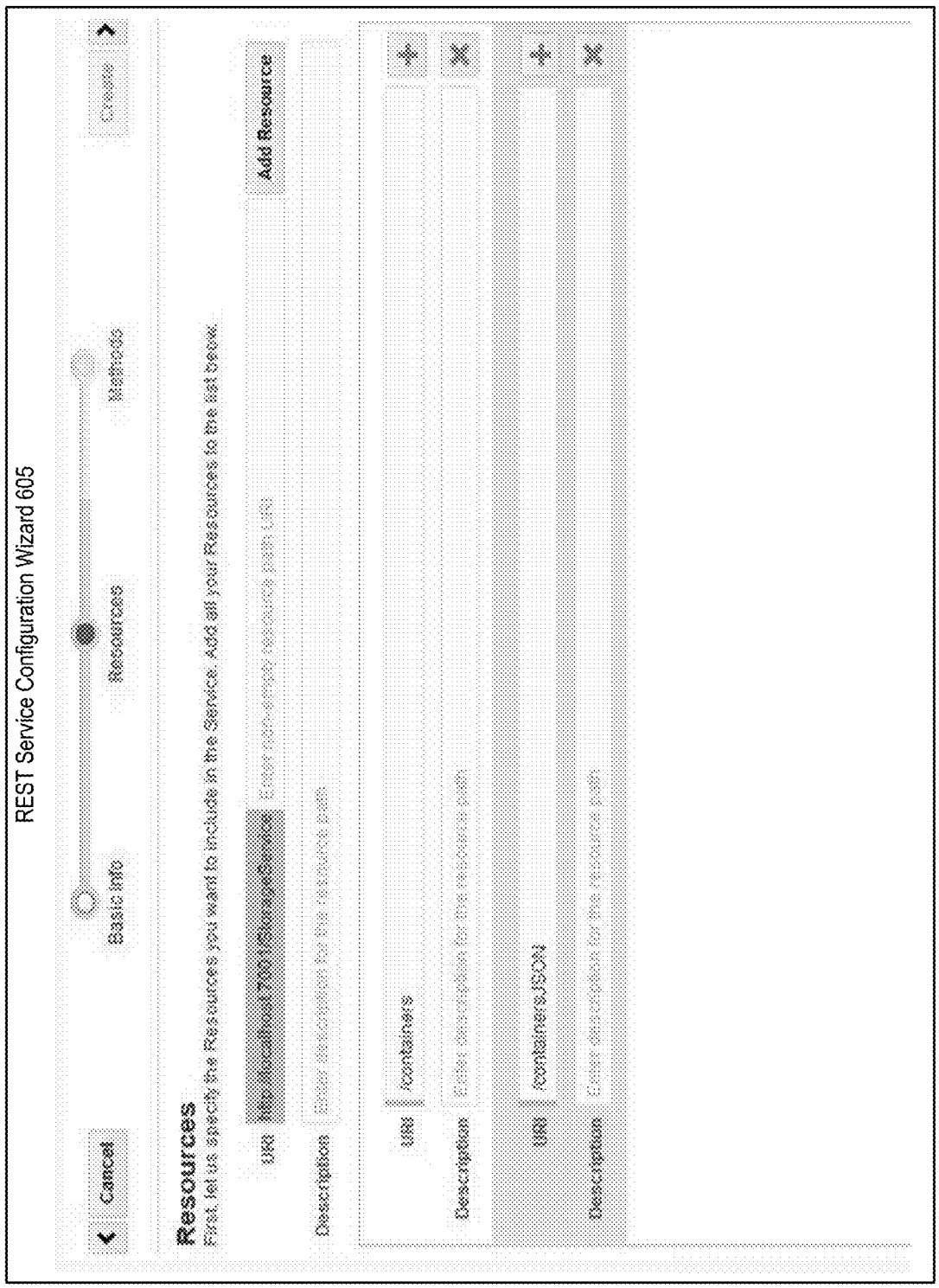

In accordance with an embodiment, the interface illustrated in FIG. 8 allows the user to specify the base URI of the external REST service and a name of a REST reference service to be created. The user can also provide a description of the REST reference service, so that it can be easier to be discovered. The interface illustrated in FIG. 9 allows the user to specify one or more resources that the user can include in the REST reference service. As shown, each resource that the user specifies can be represented by a relative URI/URL (for example, "/containers").

Figure 10:
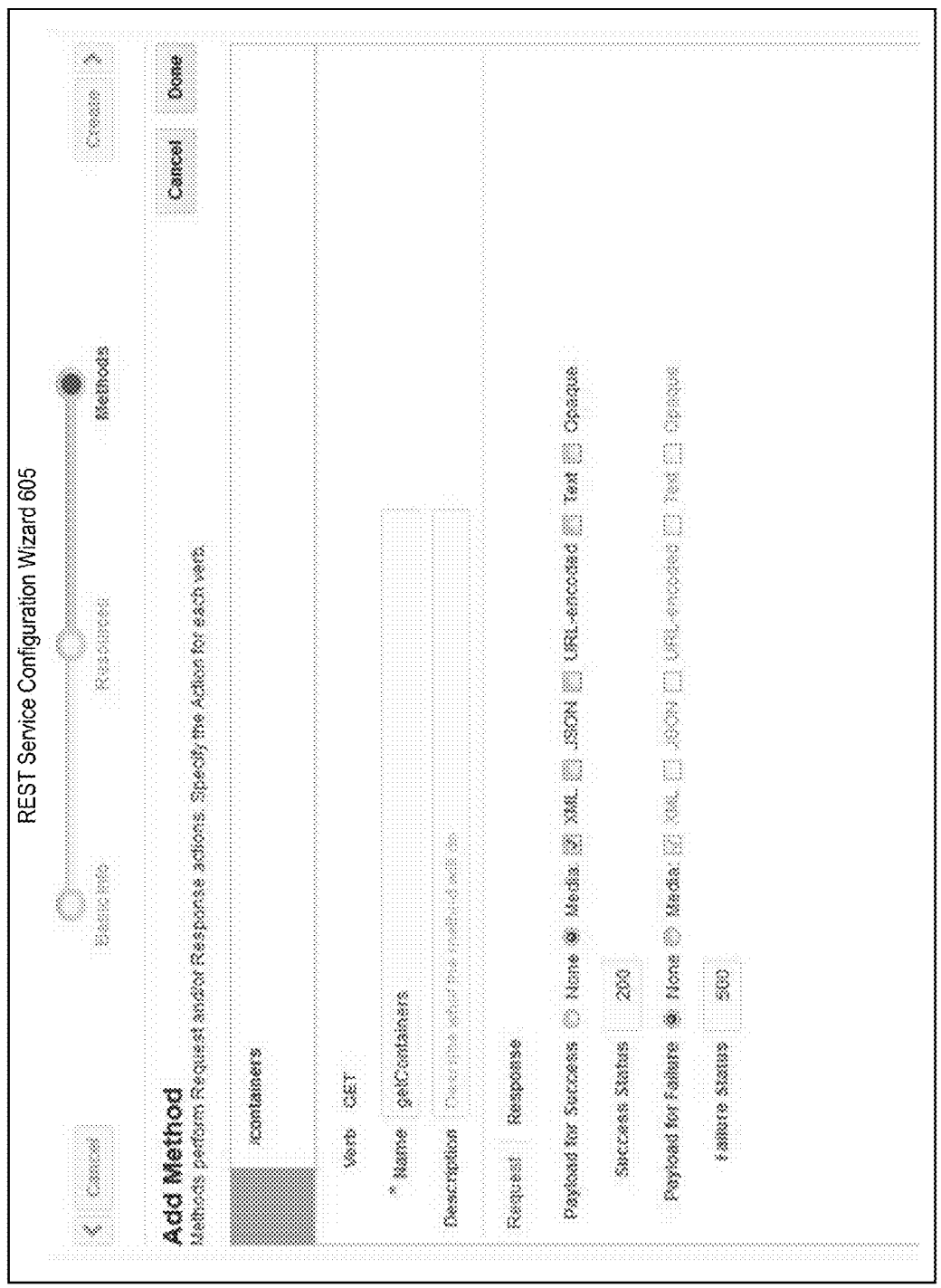

In accordance with an embodiment, the interface illustrated in FIG. 10 allows the user to select one or more methods for each selected resource. Each method can represent an operation to be performed on that resource, and can be associated with one of a plurality of HTTP verbs, for example, "GET", "POST", "DELETE", and "PUT".

For example, a method "getContainers" for the resource "containers" can be added to retrieve all the containers. The HTTP verb "GET" is automatically associated with the added method by the configuration wizard.

In accordance with an embodiment, for each method, a data format/media type can be selected for a payload of a message sent from and received by the method. The data format can be one of JSON, XML, text or binary.

In accordance with an embodiment, after the user completes the plurality of interfaces in the configuration wizard, a REST reference service and a WADL file describing the REST reference service can be generated by the REST reference service generation API. An exemplary WADL file can be shown below in Listing 1:

---
Listing 1
---
```
<ns:applicationxmlns:ns="http://wadl.dev.java.net/2009/02"
xmlns:rest="http://www.oracle.com/soa/rest">
    <ns:doc title="StorageRestService">StorageRestService</ns:doc>
    <ns:resources>
        <ns:resource path="/containers">
            <ns:method name="GET" rest:name="getContainers">
                <ns:request/>
                <ns:response status="200">
                    <ns:representation mediaType="application/
                    xml"/>
                </ns:response>
                <ns:response status="500"/>
            </ns:method>
        </ns:resource>
        <ns:resource path="/containersJSON">
            <ns:method name="GET" rest:name=
            "getContainersJSON">
                <ns:request/>
                <ns:response status="200">
                    <ns:representation mediaType="application/
                    json"/>
                </ns:response>
                <ns:response status="500"/>
            </ns:method>
        </ns:resource>
    </ns:resources>
</ns:application>
```

As shown in Listing 1, each selection made by the user and information provided by the user are included in the generated WADL file.

In accordance with an embodiment, the REST reference service generation API can be a Java API that includes a plurality of Java objects. For example, the API can include one or more objects to extract the information from the plurality of interfaces, one or more objects to sort and map the information to an appropriate sections of a WADL file to be generated.

Figure 11:
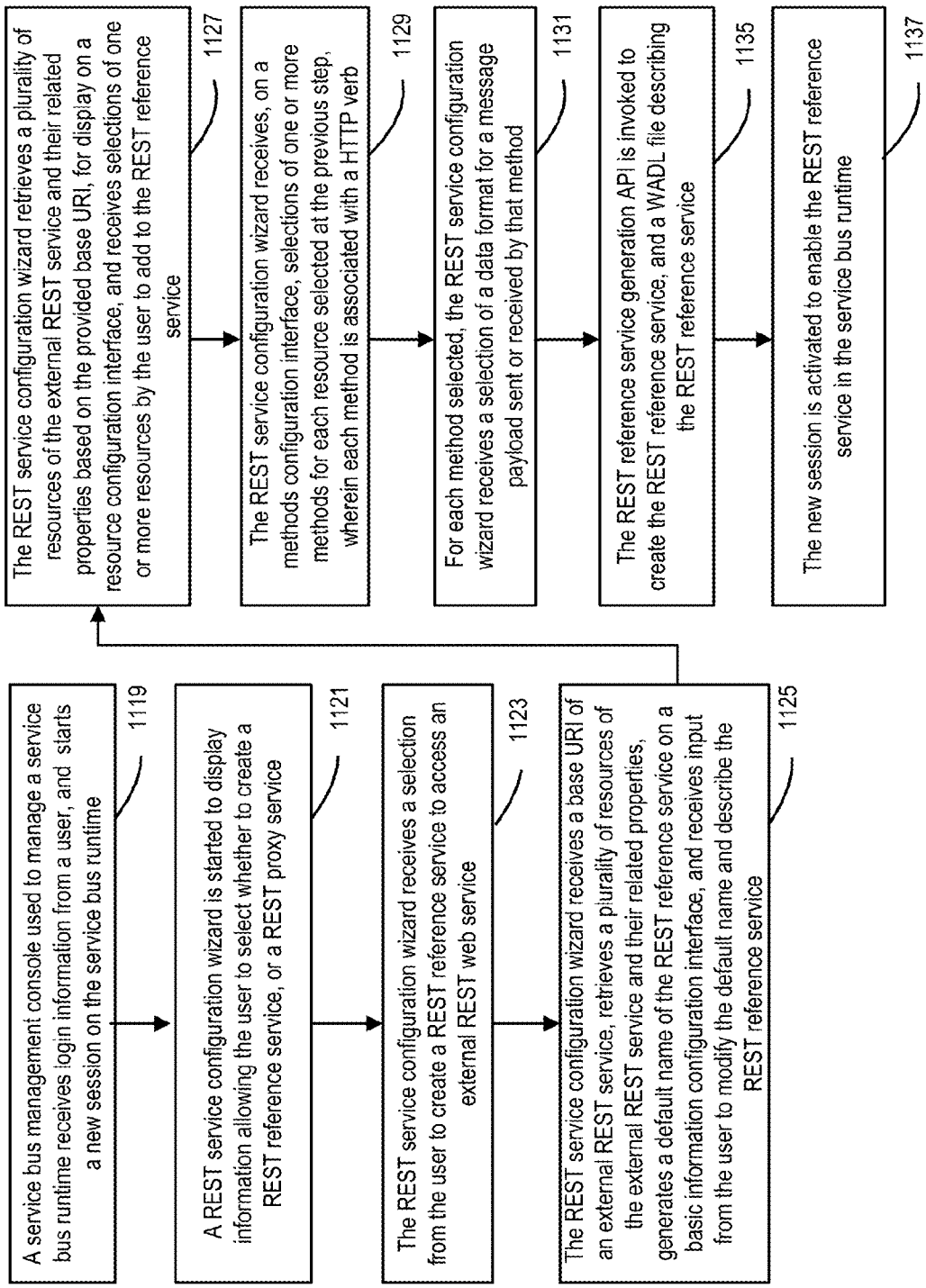
FIG. 11 illustrates a flow chart of using a configuration wizard generating a REST reference service using a configuration wizard, in accordance with an embodiment.

FIG. 11 illustrates a flow chart of generating a REST reference service using a configuration wizard, in accordance with an embodiment.

As shown in FIG. 11, at the first step 1119, a service bus management console used to manage a service bus runtime can receive login information from a user (for example, a system administrator or another type of authorized user), and start a new session on the service bus runtime.

At step 1121, a REST service configuration wizard can be start to display information allowing the user to select whether to create a REST reference service, or a REST proxy service.

At step 1124, the REST service configuration wizard can receive a selection from the user to create a REST reference service to access an external REST web service.

At step 1125, the REST service configuration wizard can receive a base URI of an external REST service, retrieve a plurality of resources of the external REST service and their related properties, generate a default name of the REST reference service on a basic information configuration interface, and receive input from the user to modify the default name and describe the REST reference service.

At step 1127, the REST service configuration wizard can retrieve a plurality of resources of the external REST service and their related properties based on the provided base URI, for display on a resource configuration interface. The REST service configuration wizard can receive selections of one or more resources by the user to add to the REST reference service.

At step 1131, the REST service configuration wizard can receive, on a methods configuration interface, selections of one or more methods for each resource selected at the previous step, wherein each method is associated with a HTTP verb.

At step 1133, for each method selected, the REST service configuration wizard can receive a selection of a data format for a message payload sent or received by that method.

At step 1135, a REST reference service generation API can be invoked to create the REST reference service, and a WADL file describing the REST reference service.

At step 1137, the new session created can be activated to enable the REST reference service in the service bus runtime.

Figure 12:
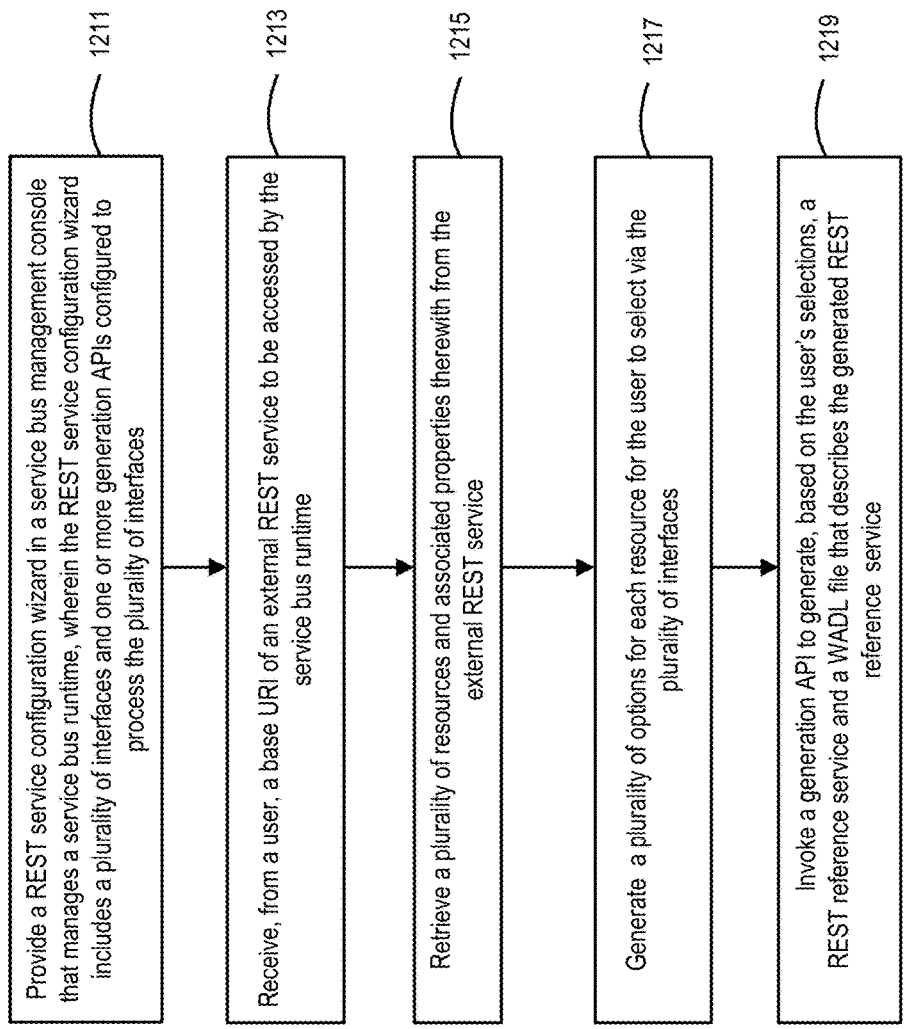
FIG. 12 illustrates a method for providing a configuration wizard to create a REST reference service, in accordance with an embodiment.

FIG. 12 illustrates a method for providing a configuration wizard for use in creating a REST reference service, in accordance with an embodiment.

At step 1211, a REST service configuration wizard can be provided in a service bus management console that manages a service bus runtime, wherein the REST service configuration wizard includes a plurality of interfaces and one or more generation APIs configured to process the plurality of interfaces.

At step 1213, a base URI of an external REST service to be accessed by the service bus runtime can received from a user.

At step 1215, the REST service configuration wizard can retrieve a plurality of resources and associated properties therewith from the external REST service.

At step 1217, a plurality of options for each resource can be generated for the user to select via the plurality of interfaces.

At step 1219, a generation API can be invoked to generate, based on the user's selections, a REST reference service and a WADL file that describes the generated REST reference service.

Figure 13:
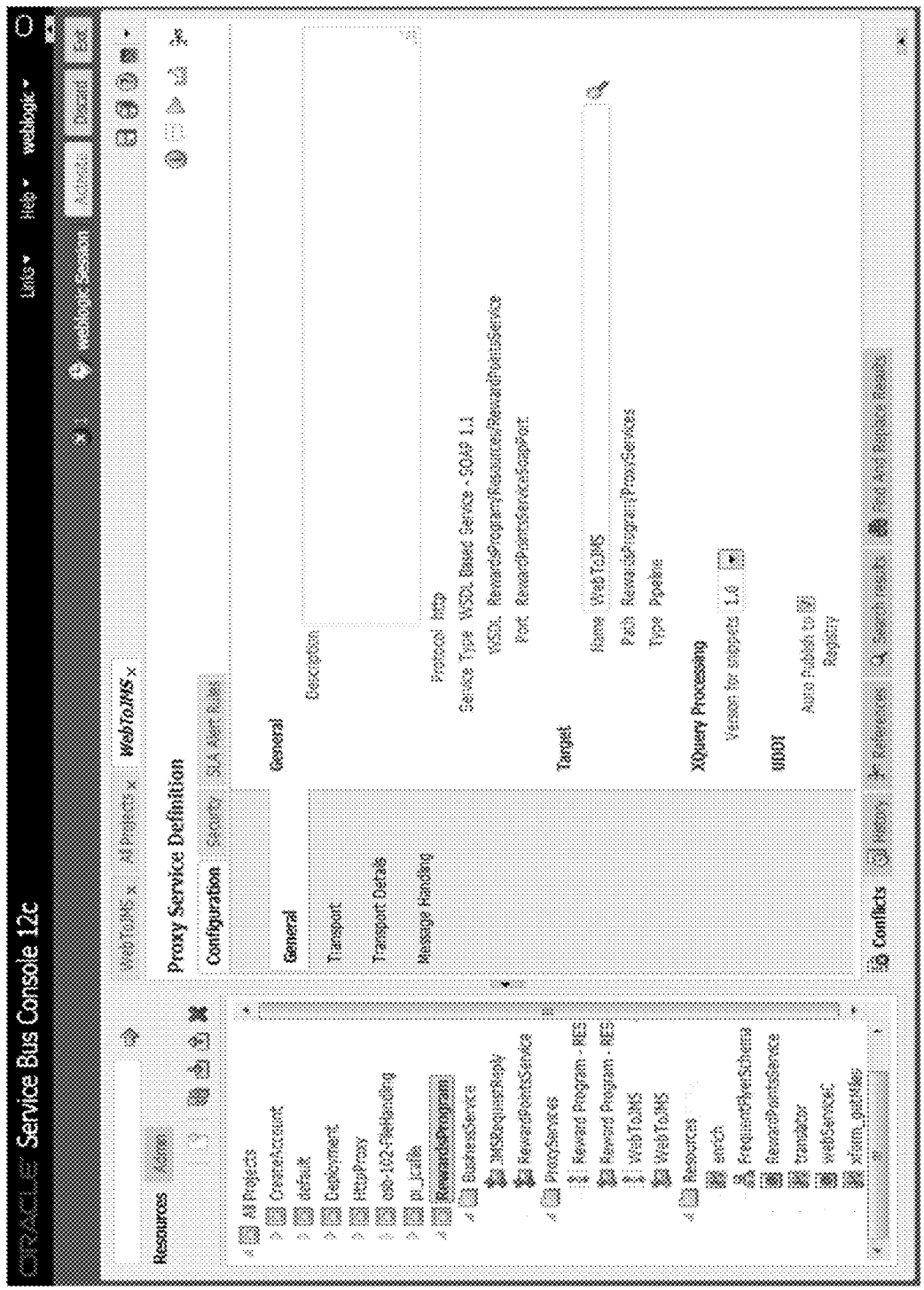
FIG. 13 illustrates a service bus configuration tool, in accordance with an embodiment.

FIG. 13 illustrates a service bus configuration tool, in accordance with an embodiment.

As shown in FIG. 13, a service bus configuration tool can be a web console, for example, Oracle Service Bus Console, wherein a user can create and configure service bus resources, test the resources, and activate the changes to a service bus runtime.

In accordance with an embodiment, service bus resources can include proxy and references services, and their supporting resources (for example, service accounts and WSDL documents). Service bus resources can be stored in the projects and folders in which they are created. The projects, folders and resource can be listed in a project navigator in a tree view.

In accordance with an embodiment, each type of service bus resource can be configured using an editor specific to that resource type. When a service bus resource is opened from the project navigator, that resource's definition editor appears, where properties for the service bus resource can be configured.

In accordance with an embodiment, changes to a service bus resource can be made within an open session, and can be propagated into the service bus runtime by activating the session. Sessions allow team collaboration when services and metadata are being configured in a service bus runtime.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for supporting end-to-end JavaScript Notation (JSON) messages in a service bus runtime, the system comprising:
    a microprocessor; and
    a service bus runtime executing on the microprocessor, wherein the service bus runtime comprises:
    a plurality of representational state transfer (REST) services comprising a REST proxy service and a REST pipeline service;
    a JavaScript Action; and
    a JavaScript engine configured to execute javaScript code in the JavaScript action, wherein the service bus runtime, when receiving a JSON message having a JSON format and comprising a payload operates to:
    receive the JSON message by the REST proxy service;
    forward the JSON message by the REST proxy service to the REST pipeline service;
    invoke the JavaScript engine to process the JSON message by manipulating the payload of the JSON message;
        use the JavaScript action by the REST pipeline service to retrieve and update context variables associated with the JSON message; and
        route the JSON message through the plurality of REST services while maintaining the JSON format of the message without converting the payload by the manipulating to or from a format other than a REST native type.

2. The system of claim 1, wherein the plurality of REST services further comprises a REST reference service.

3. The system of claim 1, wherein the JSON message is received by the REST proxy service, and forwarded by the REST proxy service to the REST pipeline service for the manipulating.

4. The system of claim 1, wherein:
    the plurality of REST services further comprises a processing engine;
    the processing engine provides bindings of the context variables associated with the JSON message and executes code in the JavaScript action; and
    the service bus runtime operates to:
    receive the JSON message of a particular REST native format, wherein a handler of the JSON message of the particular REST native format comprises an HTTP verb and a relative URL path; and
    process the JSON message of the particular REST native format using the JavaScript action to manipulate the context variables.

5. The system of claim 1, wherein the REST proxy service comprises a routing options action for use by an associated user to specify one or more arguments selected from the group consisting of an HTTP verb, a relative path, a query parameter, and an accept header value, wherein the one or more arguments are used to invoke a selected REST service.

6. The system of claim 1, wherein the REST pipeline service further comprises a REST branch node for implementing a branching logic for message routing, wherein the REST branch node is configured with a plurality of branches, each branch with a branch label specifying one or more of an HTTP verb or a URL path.

7. The system of claim 6, wherein the service bus runtime operates to use the REST branch node to route the JSON message to a particular branch based on a mapping between information in a message header and a particular branch label.

8. The system of claim 1, wherein the service bus runtime operates to route the JSON message through the plurality of REST services while maintaining the JSON format of the message without converting the payload to or from a format other than: the JSON format; an XML format; a text format; or a binary format.

9. The system of claim 1, wherein the service bus runtime operates to route the JSON message through the plurality of REST services while maintaining the JSON format of the message without converting the payload to or from an XML-based Simple Object Access Protocol (SOAP) format.

10. A method for supporting end-to-end JavaScript Notation (JSON) messages in a service bus runtime, the method comprising:
    providing a service bus runtime executing on a microprocessor, wherein the service bus runtime comprises:
    a plurality of representational state transfer (REST) services comprising a REST proxy service and a REST pipeline service;
    a JavaScript Action; and
    a JavaScript engine configured to execute javaScript code in the JavaScript action;
    receiving a JSON message at the REST proxy service of the service bus runtime, the JSON message having a JSON format and comprising a payload;
    forwarding the JSON message by the REST proxy service to the REST pipeline service;
    processing the JSON message using the JavaScript engine to manipulate the payload of the JSON message;
    using the JavaScript action by the REST pipeline service to retrieve and update context variables associated with the JSON message; and routing the JSON message through the plurality of REST services while maintaining the JSON format of the message without converting the payload by the manipulating to or from a format other than a REST native type.

11. The method of claim 10, wherein the plurality of REST services further comprises a REST reference service.

12. The method of claim 10, wherein the JSON message is received by the REST proxy service, and forwarded by the REST proxy service to the REST pipeline service for the manipulating.

13. The method of claim 10, wherein:
the plurality of REST services further comprises a processing engine;
the processing engine provides bindings of the context variables associated with the JSON message and executes code in the JavaScript action; and
the service bus runtime operates to:
receive the JSON message of a particular REST native format, wherein a handler of the JSON message of the particular REST native format comprises an HTTP verb and a relative URL path; and
process the JSON message of the particular REST native format using the JavaScript action to manipulate the context variables.

14. The method of claim 10, wherein the REST proxy service comprises a routing options action for use by an associated user to specify one or more arguments selected from the group consisting of an HTTP verb, a relative path, a query parameter, and an accept header value, wherein the one or more arguments are used to invoke a selected REST service.

15. The method of claim 10, wherein the REST pipeline service further comprises a REST branch node for implementing a branching logic for message routing, wherein the REST branch node is configured with a plurality of branches, each branch with a branch label specifying one or more of an HTTP verb or a URL path.

16. The method of claim 15, wherein the service bus runtime operates to use the REST branch node to route the JSON message to a particular branch based on a mapping between information in a message header and a particular branch label.

17. A non-transitory computer-readable storage medium storing a set of instructions for supporting end-to-end JavaScript Notation (JSON) messages in a service bus runtime, said instructions, when executed by one or more processors, causing the one or more processors to perform steps comprising:
providing a service bus runtime executing on a microprocessor, wherein the service bus runtime comprises:
a plurality of representational state transfer (REST) services comprising a REST proxy service and a REST pipeline service;
a JavaScript Action; and a JavaScript engine configured to execute javaScript code in the JavaScript action;
receiving a JSON message at the REST proxy service of the service bus runtime, the JSON message having a JSON format and comprising a payload;
forwarding the JSON message by the REST proxy service to the REST pipeline service; processing the JSON message using the JavaScript engine to manipulate the payload of the JSON message; and
using the JavaScript action by the REST pipeline service to retrieve and update context variables associated with the JSON message;
routing the JSON message through the plurality of REST services while maintaining the JSON format of the message without converting the payload by the manipulating to or from a format other than a REST native type.

18. The non-transitory computer-readable storage medium of claim 17, wherein the plurality of REST services further comprises a REST reference service.

19. The non-transitory computer-readable storage medium of claim 17, wherein the JSON message is received by the REST proxy service, and forwarded by the REST proxy service to the REST pipeline service for the manipulating.

20. The non-transitory computer-readable storage medium of claim 17, wherein:
the plurality of REST services further comprises a processing engine;
the processing engine provides bindings of the context variables associated with the JSON message and executes code in the JavaScript action; and
the service bus runtime operates to:
receive the JSON message of a particular REST native format, wherein a handler of the JSON message of the particular REST native format comprises an HTTP verb and a relative URL path; and
process the JSON message of the particular REST native format using the JavaScript action to manipulate the context variables.

21. The non-transitory computer-readable storage medium of claim 17, wherein the REST proxy service comprises a routing options action for use by an associated user to specify one or more arguments selected from the group consisting of an HTTP verb, a relative path, a query parameter, and an accept header value, wherein the one or more arguments are used to invoke a selected REST service.

22. The non-transitory computer-readable storage medium of claim 17, wherein the REST pipeline service further comprises a REST branch node for implementing a branching logic for message routing, wherein the REST branch node is configured with a plurality of branches, each branch with a branch label specifying one or more of an HTTP verb or a URL path.

* * * * *

UNITED STATES PATENT AND TRADEMARK OFFICE
CERTIFICATE OF CORRECTION

PATENT NO. : 10,210,029 B2
APPLICATION NO. : 15/483136
DATED : February 19, 2019
INVENTOR(S) : Prabhakar et al.

Page 1 of 1

It is certified that error appears in the above-identified patent and that said Letters Patent is hereby corrected as shown below:

In the Specification

In Column 6, Line 30, delete ""content-type" and insert -- content-type --, therefor.

In Column 12, Line 33, delete "can" and insert -- can be --, therefor.

Signed and Sealed this
Twenty-eighth Day of January, 2020

Andrei Iancu
*Director of the United States Patent and Trademark Office*